(12) United States Patent
Khandal et al.

(10) Patent No.: US 8,759,413 B2
(45) Date of Patent: *Jun. 24, 2014

(54) LANTHANUM CONTAINING NOVEL POLYACRYLATE FOR OPTICAL LENSES

(75) Inventors: Rakesh Kumar Khandal, Delhi (IN); Amita Malik, Delhi (IN); Geetha Seshadri, Delhi (IN); Mukti Tyagi, Delhi (IN)

(73) Assignee: Shriram Institute for Industrial Research, Delhi (IN)

( * ) Notice: Subject to any disclaimer, the term of this patent is extended or adjusted under 35 U.S.C. 154(b) by 513 days.

This patent is subject to a terminal disclaimer.

(21) Appl. No.: 12/303,659

(22) PCT Filed: Mar. 9, 2007

(86) PCT No.: PCT/IN2007/000095
§ 371 (c)(1),
(2), (4) Date: Feb. 23, 2009

(87) PCT Pub. No.: WO2007/141800
PCT Pub. Date: Dec. 13, 2007

(65) Prior Publication Data
US 2009/0209675 A1    Aug. 20, 2009

(30) Foreign Application Priority Data
Jun. 5, 2006   (IN) .............................. 1341/DEL/06

(51) Int. Cl.
*C08F 290/06* (2006.01)
*C08F 30/04* (2006.01)
*C08F 130/04* (2006.01)
*C08F 230/04* (2006.01)
*C08L 63/00* (2006.01)

(52) U.S. Cl.
USPC ............................. 522/81; 526/240; 523/442

(58) Field of Classification Search
USPC ...................... 522/81; 526/240, 442; 523/442
See application file for complete search history.

(56) References Cited

U.S. PATENT DOCUMENTS

| | | | |
|---|---|---|---|
| 4,585,841 A | | 4/1986 | Eguchi et al. |
| 4,764,575 A | * | 8/1988 | Highgate et al. ............... 526/264 |
| 6,329,058 B1 | * | 12/2001 | Arney et al. ................... 428/403 |
| 2005/0170180 A1 | * | 8/2005 | Kawa ............................ 428/402 |

* cited by examiner

Primary Examiner — Michael Pepitone
Assistant Examiner — Jessica Roswell
(74) Attorney, Agent, or Firm — The Webb Law Firm

(57) ABSTRACT

A process for the preparation of lanthanum containing polyacrylates for optical applications. The process consists in dispersing lanthanum oxide in acrylic acid to form a monomer mixture. An aromatic carboxylic acid is added to the monomer mixture and then a cross linking agent is added thereto. Such a monomer mixture is subjected to the step of polymerization by gamma radiation.

6 Claims, No Drawings

LANTHANUM CONTAINING NOVEL POLYACRYLATE FOR OPTICAL LENSES

FIELD OF INVENTION

This invention relates to a process for the preparation of polymeric materials for use in ophthalmic applications such as polarized lenses, light waveguides, optical fibres and as varnish composition for coating films.

PRIOR ART

Plastic lenses have become popular in recent years for use in optical elements such as lenses. Resins which are widely used for the production of plastic lenses are diethylene glycol basally carbonate (1.50) and polyacrylates (1.45) Lenses prepared from them have a low refractive index than glass lenses (nd=1.52). In order to obtain equivalent properties to glass lenses, it is necessary to increase the center thickness, peripheral thickness, and the curvature of the lens as a result of which the lens becomes very thick.

Still other disadvantages are poor hardness and low impact strength.

OBJECT OF THE INVENTION

An object of this invention is to propose a process for the preparation of polymeric materials for use in optical lenses and coatings.

Another object of this invention is to propose a process for the preparation of polymeric materials for use in optical lenses and coatings which has a higher refractive index in comparison to that of the known art.

A still another object of this invention is to propose a process for the preparation of polymeric materials for use in optical lenses and coatings which has a comparatively higher hardness.

Yet another object of this invention is to propose a process for the preparation of polymeric materials for use in optical lenses and coatings which has a higher impact strength in comparison to the known art.

A further object of this invention is to propose a process for the preparation of polymeric materials for use in optical lenses and coatings which is efficient.

Further object and advantages of this invention will be more apparent from the ensuing description.

DESCRIPTION OF INVENTION

According to this invention there is provided a process for the preparation of plastic material for use in optical lenses and coatings comprising in the steps of:
 a) dispersing lanthanum oxide in acrylic to form a monomer mixture;
 b) adding an aromatic carboxylic acid selected from phenyl acetic acid or cinnamic acid to such a monomer mixture;
 c) adding a cross linking such as styrene to the mixture of step c, and
 d) and subjecting the mixture of step (c) to the step of polymerization by gamma radiation.

In accordance with this invention the process comprises in dispersing 14 to 17% by weight of lanthanum oxide in acrylic acid. It has been found that if more than 17% by weight of lanthanum oxide is added to acrylic acid, then the mixture is no longer homogenous as some of the metal salt precipitates out. The mixture is stirred at a temperature of 25 to 30° C. to obtain a homogenous mixture. The mixture thus prepared is the monomer mixture.

The monomer mixture has a refractive index of 1.461 upon addition of 17% by weight of metal salt with respect to acrylic acid and 1.493 upon addition of 14% by weight of addition of metal salt with respect to acrylic acid in comparison to a refractive index of 1.420 of acrylic acid.

To such a mixture, an aromatic carboxylic acid is added to increase the refractive index. The aromatic carboxylic acid is selected from phenyl acetic acid or cinnamic acid. It has been found that cinnamic acid, a yellow colored substance imparts yellow colour to the material. Thus, in the instance where colour is not desired, such as spectacle lenses, phenyl acetic acid is used for the lense and for applications such as coatings, cinnamic acid is used. It has been found that the presence of metal ions is responsible for a substantial improvement in the impact strength of the polymer, even though the presence of such metal ions increases the refractive index of acrylic acid only marginally.

As described hereinabove, the metal salt is first added and stirred to form a homogeneous mixture. However, if the aromatic carboxylic acid is first added followed by addition of metal ions, then the dispersability decreases.

The aromatic carboxylic acid is also added under stirring conditions and at ambient temperature. Phenyl acetic acid is added in an amount of 19 to 21% by weight of acrylic acid and cinnamic acid in an amount of 9 to 11% by weight of acrylic acid. If more than 21% by weight of phenyl acetic acid to acrylic acid or 11% by weight of cinnamic acid to acrylic acid is added to the mixture, there is no increase in the refractive index. However, if less than 19% by weight of phenyl acetic acid or 9% by weight of cinnamic acid is added to the mixture, then there is a reduction in the refractive index.

A cross linking agent such a styrene is finally added to the mixture and in an amount of 0.3 to 0.4 moles. Styrene also assists in improving the cross linking of the monomer units.

Such a mixture is subjected to the step of polymerization by gamma radiation in the presence of cobalt 60 as the radiation source. In the instance, where lenses are required, the mixture is subjected to the step of cast polymerization in glass moulds. The dose employed to achieve complete polymerization is 0.8 to 1.2 megarads.

Further objects and advantages of this invention will be more apparent from the ensuing examples, which are not intended to impart any restriction on the scope of the invention.

EXAMPLE 1

5 gms of mixture containing 13% lanthanum oxide dispersed in acrylic acid and phenyl acetic acid was added to 3.12 gms of styrene. The mixture was poured into a mould made from two glass blanks and a gasket and subjected to gamma radiation in the presence of cobalt 60 at a dose of 0.8 megarads. The cast lens had the following properties:

| | |
|---|---|
| Refractive index | 1.565 |
| Transmittance | >90% |
| Shore D-hardness | 85 |
| Abbey no | 35 |
| Impact strength | Passes FDA standards |

EXAMPLE 2

4.20 gms of styrene was added to 5 gms of mixture containing lanthanium oxide dispersed in acrylic acid and phenyl acetic acid. Such a mixture was injected into glass mould and subjected to gamma radiation in the presence of cobalt 60 at a dose of 1.2 magards. The following properties were obtained:

| | |
|---|---|
| Refractive index | 1.535 |
| Transmittance | >90% |
| Shore D-hardness | 85 |
| Abbey no | 35 |
| Impact strength | Passes FDA standards |

EXAMPLE 3

Example 2 was repeated except that cinnamic acid was used instead of phenyl acetic acid. The gamma radiation was carried out at a dose of 0.8 megarods. The polymerized material was yellow coloured which can be used as a coating.

It is to be noted that the present invention is susceptible to modifications, adaptations and changes by those skilled in the art. Such variant embodiments employing the concepts and features of this invention are intended to be within the scope of the present invention, which is further set forth under the following claims:

We claim:

1. A process for the preparation of plastic material for use in optical lenses and coatings comprising in the steps of:
   a) dispersing lanthanum oxide in acrylic acid to form a monomer mixture;
   b) adding an aromatic carboxylic acid selected from phenyl acetic acid or cinnamic acid to the monomer mixture;
   c) adding a cross linking agent selected from styrene to the mixture of step b; and
   d) subjecting the mixture of step c to the step of polymerization by gamma radiation,
   wherein steps a through d are performed in order.

2. A process as claimed in claim 1 wherein 14 to 17% by weight of lanthanum oxide is added to acrylic acid.

3. A process as claimed in claim 1 wherein said lanthanum oxide is added to acrylic acid under stirring conditions and at ambient temperature.

4. A process as claimed in claim 1 wherein 18 to 21% by weight of phenyl acetic acid or 9 to 11% by weight of cinnamic acid is added to the mixture of acrylic acid and metal salt.

5. A process as claimed in claim 4 wherein said phenyl acetic acid or cinnamic acid is added to said mixture and stirred.

6. A process as claimed in claim 1 wherein the dose of radiation is 0.8 to 1.2 megarads.

* * * * *